(12) United States Patent
Böttger et al.

(10) Patent No.: US 7,891,189 B2
(45) Date of Patent: Feb. 22, 2011

(54) METHOD AND DEVICE FOR CARRYING OUT A THERMODYNAMIC CYCLE

(75) Inventors: Matthias Böttger, Berlin (DE); Jörg Lengert, Lonnerstadt-Ailsbach (DE)

(73) Assignee: Siemens Aktiengesellschaft, Munich (DE)

( * ) Notice: Subject to any disclaimer, the term of this patent is extended or adjusted under 35 U.S.C. 154(b) by 255 days.

(21) Appl. No.: 10/566,768

(22) PCT Filed: Jul. 7, 2004

(86) PCT No.: PCT/EP2004/007443

§ 371 (c)(1),
(2), (4) Date: Jan. 31, 2006

(87) PCT Pub. No.: WO2005/014981

PCT Pub. Date: Feb. 17, 2005

(65) Prior Publication Data

US 2006/0207255 A1    Sep. 21, 2006

(30) Foreign Application Priority Data

Jul. 31, 2003    (DE) .................................. 103 35 134

(51) Int. Cl.
*F01K 25/06*    (2006.01)
(52) U.S. Cl. .............................. 60/649; 60/651; 60/671
(58) Field of Classification Search ................... 60/649, 60/651, 671, 673
See application file for complete search history.

(56) References Cited

U.S. PATENT DOCUMENTS 5,029,444 A * 7/1991 Kalina ......................... 60/673
6,769,256 B1 * 8/2004 Kalina ......................... 60/653
6,941,757 B2 * 9/2005 Kalina ......................... 60/649

FOREIGN PATENT DOCUMENTS

| DE | 100 52 414 A1 | 5/2002 |
| EP | 0 378 428 A2 | 7/1990 |
| EP | 0 472 020 A1 | 2/1992 |
| EP | 0 952 316 A2 | 10/1999 |

OTHER PUBLICATIONS

Von W. Gajewski, A. Lezuo, R. Nürnberg, B. Rukes and H. Vesper, "Der Kalina-Prozeβ", VGB Kraftwerkstechnik, VGB Kraftwerkstechnik GmbH, Essen, Germany, vol. 69, No. 5, May 1, 1989, pp. 477-483, XP000028691.

* cited by examiner

*Primary Examiner*—Hoang M Nguyen

(57) ABSTRACT

The invention relates to a liquid working substance flow, the pressure of said flow being increased and the flow itself being subdivided into a first partial flow and a second partial flow. The first partial flow is partially evaporated with heat from a heat source, and the second partial flow with heat from a working substance flow with a low surface tension. The two partial flows are then combined and produce a gaseous working substance flow with heat from the heat source. The surface tension of said gaseous flow is reduced and the energy thereof converted into a usable form. The working substance flow with a low surface tension is condensed, thus producing the liquid working substance flows. According to the invention, the first partial flow and the liquid working substance flow are essentially at the same temperature. In this way, the heat of the heat source can be better used, thus increasing the efficiency of the cycle.

18 Claims, 4 Drawing Sheets

METHOD AND DEVICE FOR CARRYING OUT A THERMODYNAMIC CYCLE

CROSS REFERENCE TO RELATED APPLICATIONS

This application is the US National Stage of International Application No. PCT/EP2004/007443, filed Jul. 7, 2004 and claims the benefit thereof. The International Application claims the benefits of German Patent application No. 10335134.5 filed Jul. 31, 2003. All of the applications are incorporated by reference herein in their entirety.

FIELD OF THE INVENTION

The invention relates to a method and a device for executing a thermodynamic cycle in accordance with the claims.

BACKGROUND OF THE INVENTION

Thermal power stations use thermodynamic cycle processes for converting heat into mechanical or electrical energy. Conventional thermal power stations create the heat by burning fuel, in particular the fossil fuels coal, oil and gas. The cycle processes are operated in this case for example on the basis of the classic Rankine cycle with water as its working substance. Its high boiling point however makes water unattractive, especially when using heat sources with temperatures between 100° and 200° C., e.g. geothermal liquids or waste heat from combustion processes, because the process is not cost effective.

For heat sources with such a low temperature a wide diversity of technologies have been developed over recent years which make it possible to convert their heat into mechanical or electrical energy with a high degree of efficiency. As well as the Rankine process with organic working substances (Organic Rankine Cycle, ORC) a process known as the Kalina cycle process stands out by virtue of its markedly better levels of efficiency compared to the classic Rankine process. Various cycles for different applications have been developed on the basis of the Kalina cycle. Instead of water these cycles use a mixture of two substances (e.g. ammonia and water) as their working substance, with the non-isothermic boiling and condensation process of the mixture being utilized to increase the efficiency of the cycle by comparison with the Rankine cycle.

For temperatures of the heat source of at least 140° C. the Kalina cycle system KCS 11 (Kalina Cycle system 11) is preferably used. In this case a liquid working substance is pumped into a heat exchanger, referred to below as a preheating "heat exchanger" where it is heated up to boiling point by partial condensation of an expanded working substance flow. The pressurized boiling working substance flow is then divided up by a separator into a first and second partial flow. The first partial flow is partially evaporated in a first, further heat exchanger using heat generated by cooling down of a heat source (e.g. a geothermal liquid). The second partial flow is partially evaporated in a second, further heat exchanger using heat generated by partial condensation of the expanded working substance flow.

The partially evaporated first and second partial flows are subsequently combined by a mixer and a partially evaporated working substance flow is formed. Subsequently in a third, further heat exchanger a gaseous working substance flow is created by transmission of heat from the heat source to the partially evaporated working substance flow.

The gaseous working substance flow is subsequently expanded in a turbine and its energy is used for power generation. The expanded working substance flow is then partially condensed in the already mentioned second, further heat exchanger and in the preheating heat exchanger and finally created in a condenser by complete condensation of the liquid working substance mentioned at the start and the cycle thereby closed.

SUMMARY OF THE INVENTION

The object of the present invention is to create a method and a device for executing a thermodynamic cycle process which, by comparison with the prior art mentioned, makes possible a higher yield of mechanical and/or electrical energy without a significant increase in the costs of the plant.

The object to which the method is directed is successfully achieved in accordance with the invention by a method claimed in the claims. Advantageous embodiments of the method are the object of the subclaims. The object to which the device is directed is successfully achieved in accordance with the invention by a device as claimed in the claims. Advantageous embodiments of the device are the object of the subclaims.

The invention uses as its starting point the idea that the heat of the heat source can be utilized all the better, the lower the temperature of the working substance before the partial evaporation of the first partial flow. If the first partial flow essentially features the same (low) temperature as the liquid working substance flow, more heat can be extracted from the heat source and used for generation of mechanical and/or electrical energy then when the liquid working substance flow has already been preheated. "Essentially the same temperature" is taken within the context of the invention to mean that the temperature difference amounts to only a few degrees Kelvin, e.g. because of slight cooling down of the pressurized liquid working substance before formation of a first partial flow or because of the pumping of the liquid working substance at an increased pressure.

A comparatively better utilization of the heat source than in the prior art is thus possible, in which the first partial flow, because of the preheating of the pressurized liquid working substance flow up to boiling temperature by means of the preheating heat exchanger has a higher temperature than the liquid working substance flow.

The invention makes it possible, by appropriate dimensioning of the cycle, especially the heating surfaces of the heat exchanger, especially to increase the mass flow important for the working substance for the generation of the mechanical or electrical energy at a pressure, temperature and enthalpy of the gaseous working substance flow as well as of the liquid working substance flow which otherwise remains essentially the same compared with the prior art.

The energy yield from better utilization of the heat of the heat source is in this case greater than the losses resulting from the non-utilization of the energy of the expanded working substance flow for preheating the pressurized liquid working substance flow with the aid of a preheating heat exchanger. Although an increased need for heating surfaces results in a demand for greater investment, these increased costs can largely be compensated for by the omission of the preheating heat exchanger and the resulting simplified pipework, so that the plant costs remain essentially the same.

The first and the second heat exchanger are in this case advantageously dimensioned so that the first and the second partially evaporated partial flow have approximately the same temperature and the same steam content.

In accordance with an embodiment of the invention a multi-substance mixture is used as the working substance.

The multi-substance mixture is preferably a two-substance mixture especially an ammonia-water mixture. As a result of the non-isothermic vaporization and condensation of such a mixture an especially high level of efficiency of the cycle can be achieved.

Energy can be obtained in an especially environmentally-friendly way by using a geothermal liquid, especially thermal water from a geothermal source, as the heat source. Waste gases (exhaust gases) from gas and/or steam turbine plants can also be used as a heat source or heat generated in industrial production processes (e.g. in steel production) can be used.

A high level of efficiency of this cycle can in this case be achieved by the heat source having a temperature of 100° C. to 200° C., especially 140° C. to 200° C.

BRIEF DESCRIPTION OF THE DRAWINGS

The invention as well as a further advantageous embodiments of the invention in accordance with the features of the subclaims are explained in more detail below with reference to exemplary embodiments in the figures. The Figures show:

DETAILED DESCRIPTION OF THE INVENTION

Figure 1:
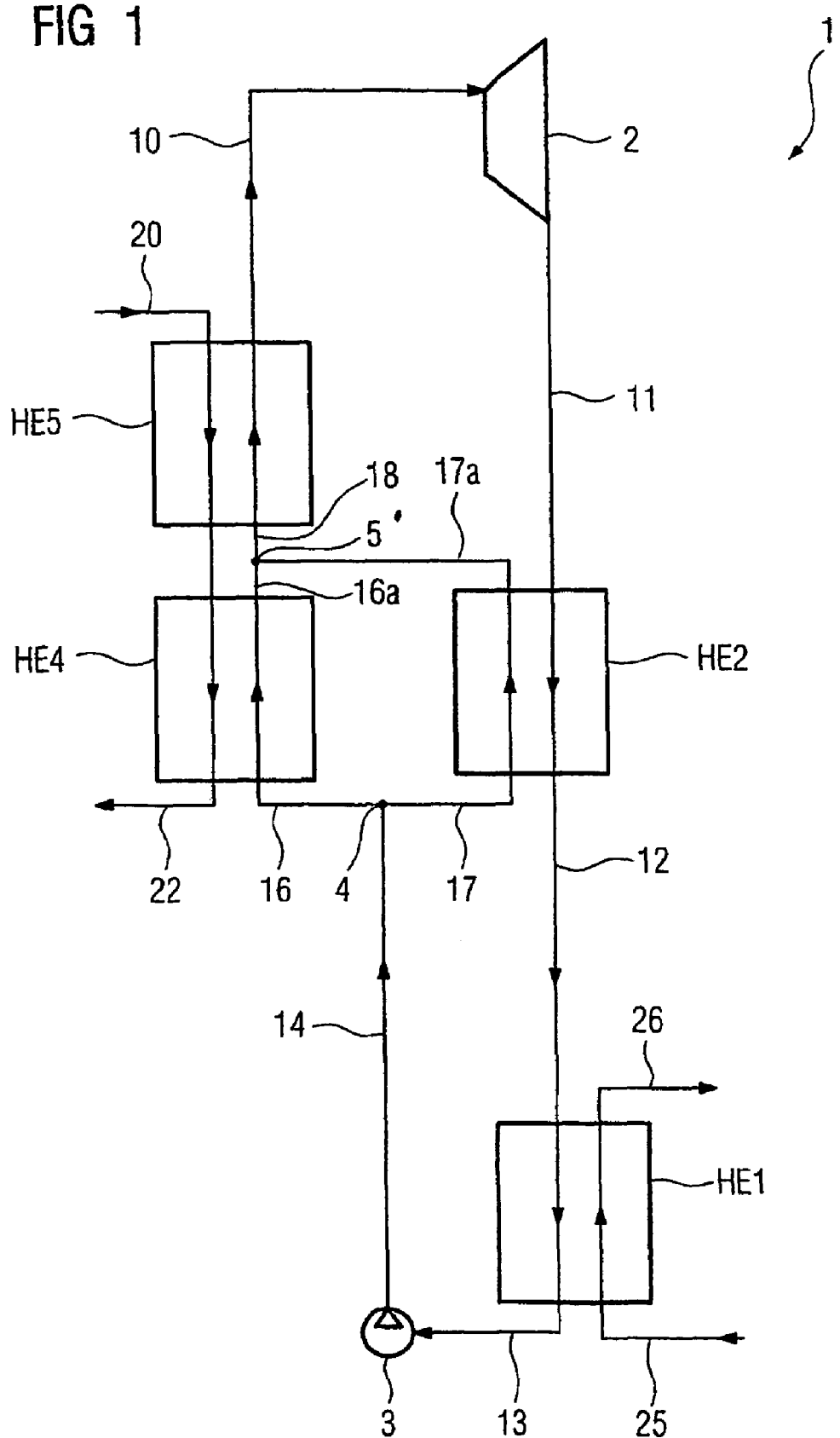
FIG. 1 a circuit of an inventive device for executing a thermodynamic cycle process in a simplified schematic presentation, FIG. 2 a cycle calculation for a device in accordance with FIG. 1, FIG. 3 a circuit for a device known from the prior art for executing a thermodynamic cycle process in a simplified, schematic diagram, FIG. 4 a cycle calculation for a device in accordance with FIG. 3.

The device 1 shown in FIG. 1 for executing a thermodynamic cycle process features a (recuperative) heat exchanger HE5, which on the primary side has hot thermal water 20 from a geothermal source not shown in any greater detail flowing through it and is connected on the secondary side on the one hand to a mixer 5 and on the other hand to a turbine 2. The turbine 2 is connected on its output side to the secondary side of a heat exchanger HE2 which is connected in its turn to the primary side of a condenser HE1. The condenser HE1 is connected at its primary side output, if nec. via a condensate tank, via a pump 3 to a separator 4. The separator 4 is connected on the one hand via the primary side of the heat exchanger HE2 and on the other via the secondary side of the heat exchanger HE4 to the mixer 5. The primary sides of heat exchangers HE5 and HE4 are connected to each other for letting through hot thermal water 20, with the thermal water first flowing through the heat exchanger HE3 and then through the heat exchanger HE4.

A two-substance mixture of water and ammonia which thus exhibits a non-isothermal evaporation and condensation is used a working substance in the device 1. The working substance is present after the condenser HE1 in a liquid state as liquid working substance flow 13. With the aid of the pump 3 the liquid working substance flow 13 is pumped at an increased pressure and a pressurized liquid working substance flow 14 created, which is divided up by the separator 4 into a first partial flow 16 and a second partial flow 17.

The first partial flow 16 essentially has the same temperature as the liquid working substance flow 13. The first partial flow 16 is accepted on the secondary side by the heat exchanger HE4 and, using heat already created by the cooling down of the thermal water flow 20 in the heat exchanger HE5, is partially evaporated and creates a partially evaporated first partial flow 16a. The second partial flow 17 is accepted on the primary side by the heat exchanger HE2 and using heat generated by partial condensation of a expanded working substance flow 11 accepted on the secondary side, is partially evaporated and creates a partially evaporated second partial flow 17a. The partially evaporated first and second partial flows 16a, 17a are subsequently combined in the mixer 5 into one partially evaporated working substance flow 18. The heat exchangers HE2 and HE4 are in this case dimensioned so that the first and the second partially evaporated partial flow 16a or 17a have approximately the same temperature and the same steam content.

The partially evaporated working substance flow 18 is subsequently accepted on the secondary side of the heat exchanger HE5 and through cooling down of the hot thermal water flow 20 accepted on the primary side a completely evaporated, if necessary partially overheated gaseous working substance flow 10 is created. The gaseous working substance flow 10 will subsequently be expanded in the turbine 2, its energy converted into a usable form, e.g. into current via a generator not shown, and the expanded working substance flow 11 created. The expanded working substance flow 11 is partially condensed in the heat exchanger HE2 and a partially condensed, expanded working substance flow 12 created. The partially condensed expanded working substance flow 12 is subsequently condensed in the heat exchanger (condenser) HE1 with the aid of an inflowing cooling water flow 25 and the liquid working substance flow 13 created. The heat transmitted by the condensation of the expanded working substance flow 12 to the cooling water flow 25 is discharged by the outflowing cooling water flow 26.

Figure 2:
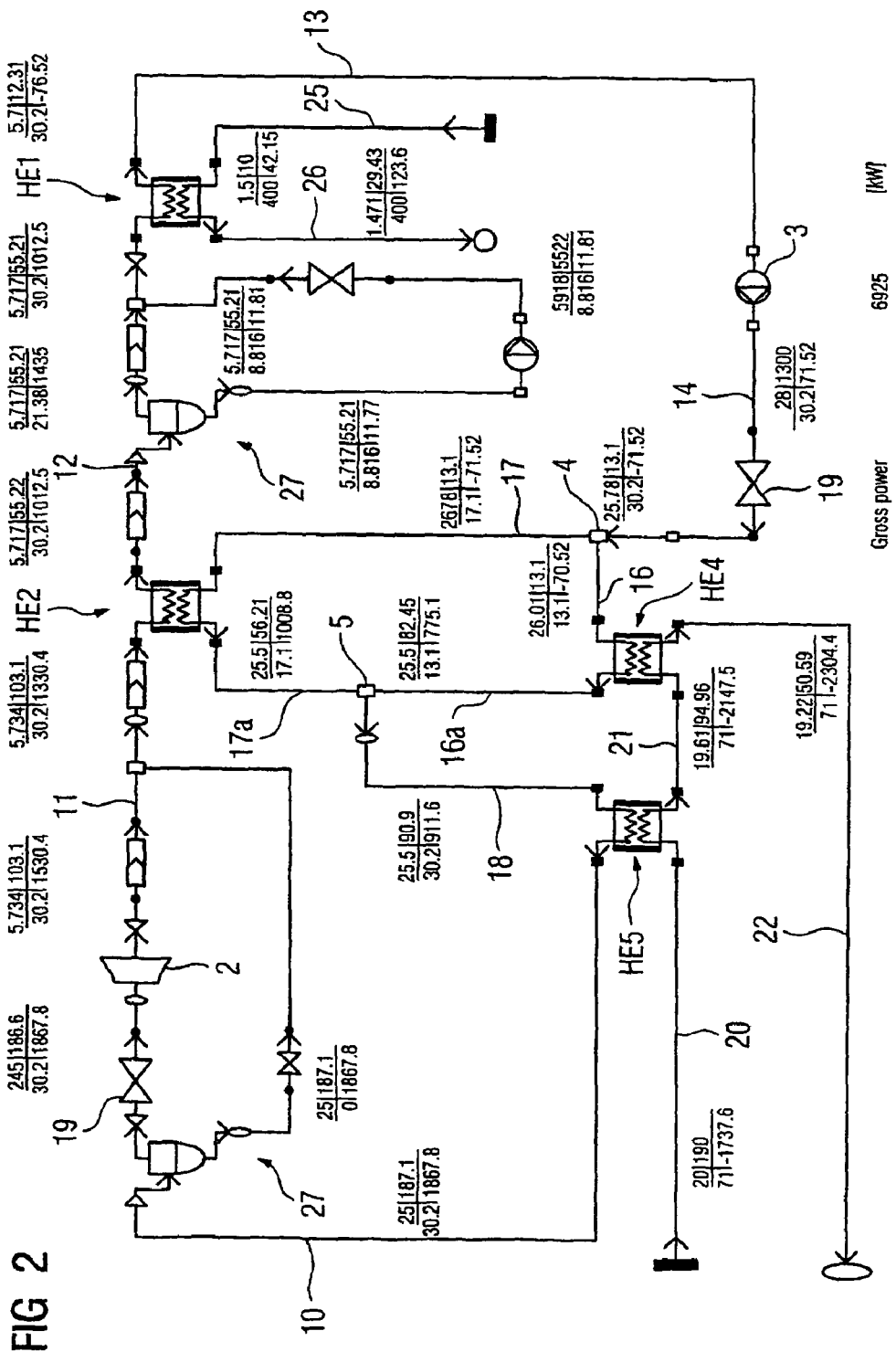

FIG. 2 shows a cycle calculation for a device for execution of the thermodynamic cycle process, which essentially corresponds to the device shown in FIG. 1 and has additionally only been supplemented by a small number of valves and separator circuits 27. The following have been chosen as initial conditions for the calculations:

|  | Temperature | Mass flow |
| --- | --- | --- |
| Thermal water flow 20 | 190° C. | 71 kg/s |
| Cooling water flow 25 | 10° C. | appr. 400 kg/s |

The ammonia concentration in the water amounts to 81%.

Table 1 shows for a number of selected flows of the cycle the result of the cycle calculation, with the power of the heat exchangers being selected in accordance with Table 2.

TABLE 1

| Flow | Temperature (° C.) | Enthalpy (kJ/kg) | Mass flow (kg/s) | Pressure (bar) |
| --- | --- | --- | --- | --- |
| 10 | 187.1 | 1867.8 | 30.2 | 25 |
| 13 | 12.3 | −76.52 | 30.2 | 5.7 |
| 16 | 13.1 | −70.52 | 13.1 | 26.01 |
| 20 | 190 | −1737.6 | 71 | 20 |
| 22 | 50.59 | −2304.1 | 71 | 19.22 |

TABLE 2

| Heat exchanger | Power |
| --- | --- |
| HE1 (condenser) | 32.51 kW |
| HE2 | 18.47 kW |

TABLE 2-continued

| Heat exchanger | Power |
|---|---|
| HE4 | 11.02 |
| HE5 | 28.87 kW |
| Total | 90.87 kW |

The temperature of the first partial flow 16 before entry into the heat exchanger HE4 amounts to 13.1° C. and is thus at about the same temperature as the pressurized liquid working substance flow 14 or the liquid working substance flow 13 (12.3° C.). The electrical power which can be generated under these conditions with the aid of the turbine 2 amounts to 6925 kW.

Figure 3:
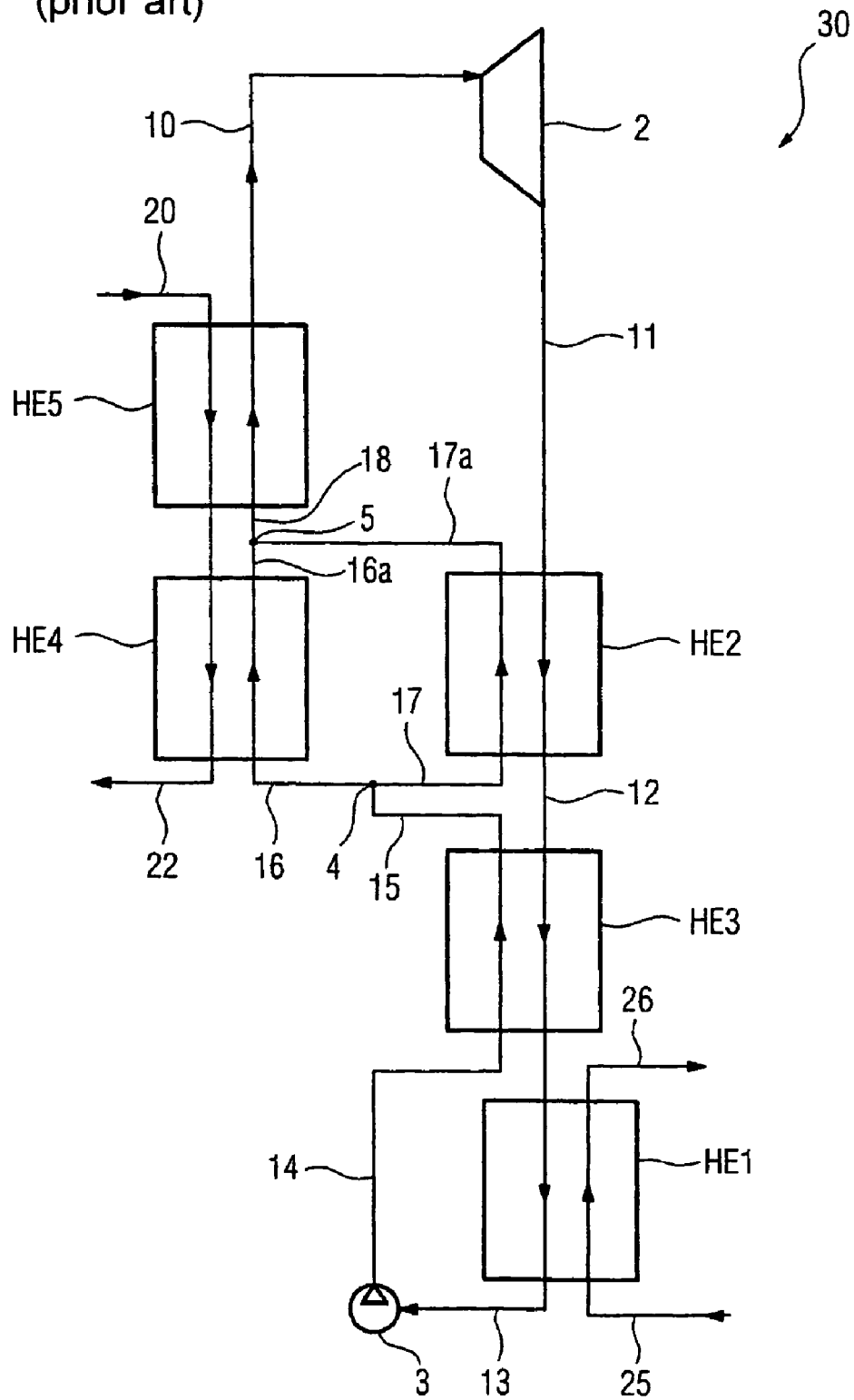

FIG. 3 by contrast shows the circuit of a device 30 known in the prior art as KCS 11 (Kalina Cycle System 11) for executing a thermodynamic cycle. For better comparison of the known device 30 with the inventive device shown in FIG. 1 the corresponding elements or working substance flows are provided with the same reference symbols. Device 30 differs from the inventive device shown in FIG. 1 through a additional (recuperative) preheating heat exchanger HE3 connected on the primary side between the pump 3 and the separator 4 and on the secondary side between the heat exchanger HE2 and the condenser HE1. With the aid of the heat exchanger HE3 the pressurized, liquid working substance flow 14 is heated by further partial condensation of the already partially condensed, expanded working substance flow 12 up to its boiling point. The first partial flow 16 thus has the saturated water temperature and is fed at this temperature to the heat exchanger HE4. Because of this considerably increased temperature compared to the liquid working substance flow 13 the heat of the thermal water flow 20 can be utilized less in the heat exchangers HE4 and HE5.

Figure 4:
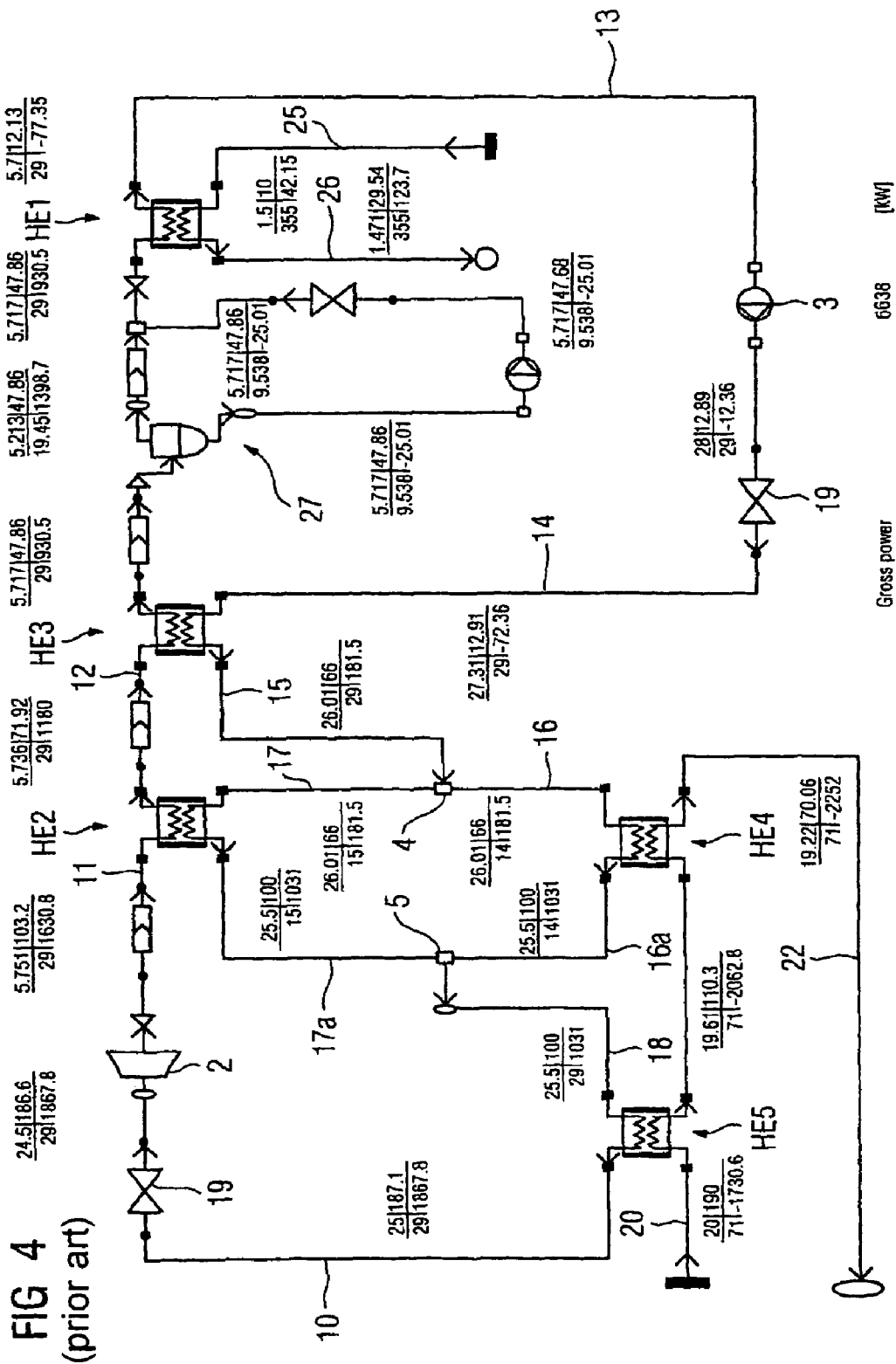

FIG. 4 shows a cycle calculation for a device known from the prior art which essentially corresponds to the device 30 shown in FIG. 3 and has additionally only been supplemented by a number of valves 19 and a separator circuit 27. The same initial conditions for the calculations are used as those which were used for the cycle calculation in accordance with FIG. 2.

Table 3 shows for a number of selected flows of the cycle the result of the cycle calculation, with the power of the heat exchangers being selected in accordance with Table 4.

TABLE 3

| Flow | Temperature (° C.) | Enthalpy (kJ/kg) | Mass flow (kg/s) | Pressure (bar) |
|---|---|---|---|---|
| 10 | 187.1 | 1867.8 | 29 | 25 |
| 13 | 12.13 | −77.35 | 29 | 5.7 |
| 16 | 66 | 181.5 | 14 | 26.01 |
| 20 | 190 | 1730.6 | 71 | 20 |
| 22 | 70.06 | −2252 | 71 | 19.22 |

TABLE 4

| Heat exchanger | Power |
|---|---|
| HE1 (condenser) | 28.94 kW |
| HE2 | 12.74 kW |
| HE3 | 7.36 kW |
| HE4 | 11.89 kW |
| HE5 | 24.26 kW |

The electrical power able to be generated in this case amounts to only 6638 kW. The obtainable electrical power is thus higher in the case of the inventive cycle according to FIGS. 1 and 2 by 4.3% than in the case of the cycle known from the prior art. This additional yield comes from the higher heat extracted from the thermal water (the temperature of the outflowing thermal water 22 amounts to only 50.59° C. in the case of the cycle shown in FIG. 2 compared to 70.06° C. in the case of the cycle shown in FIG. 4) and the higher mass flow of the working substance obtainable before entry into the turbine 2 (30.2 kg/s in the case of the cycle shown in FIG. 2 and 29 kg/s in the case of the cycle shown in FIG. 4).

The increased heating surface requirement of 6.25% also resulting from the increased heat exchanger power results in a greater need for investment. These increased costs can however be balanced out in large part by the simplified pipework on the evaporation side of the turbine 2 and by the omission of heat exchanger HE2, so that the plant costs overall remain essentially the same.

The invention has been described above with reference to preferred exemplary embodiments, but can generally be seen as not being restricted to these exemplary embodiments. Instead there is the option of a plurality of variations and modifications of the invention or of these exemplary embodiments. For example the number of heat exchangers can be increased, additional valves and separators can be connected into the circuit—as also occurs in the circuit example depicted in FIG. 2. Furthermore the gaseous working substance flow 10 can be expanded in more than one step, e.g. via two turbines switched in series.

The invention claimed is:

1. A method for performing a thermodynamic cycle, comprising:
   pressurizing a liquid working substance flow;
   separating the pressurized liquid working substance flow into a first partial flow and a second partial flow, the first and second partial flows and the liquid working substance flow having a similar temperature and pressure;
   partially vaporizing the first partial flow by transferring heat energy from a heat source to the first partial flow;
   partially vaporizing the second partial flow by transferring heat energy from an expanded working substance flow to the second partial flow;
   combining in a mixer the partially vaporized first and second partial flows to supply a partially evaporated working substance flow, the first and second partial flows having similar temperatures and steam contents;
   directly connecting to the mixer a first heat exchanger to receive the partially evaporated working substance flow;
   creating in the first heat exchanger a fully vaporized working substance flow by vaporizing the partially evaporated working substance flow by transferring heat energy from a heat source to the partially evaporated working substance flow and by separating residual liquid components from the vaporized working substance flow via a separator circuit arranged after the first heat exchanger and before the fully vaporized working substance flow enters a turbine;
   creating the expanded working substance flow by expanding the vaporized working substance flow in the turbine and converting the thermal energy of the working substance flow into a usable form;
   partially condensing in a second heat exchanger the expanded working substance flow thereby creating a partially condensed, expanded working substance flow, and completely condensing the partially condensed, expanded working substance flow in a condenser to form the liquid working substance flow to complete the thermodynamic cycle, wherein a mass flow exiting the second heat exchanger corresponds to a mass flow entering the condenser.

2. The method as claimed in claim 1, wherein the first and second partial flows and the liquid working substance flow have the same temperature and pressure.

3. The method as claimed in claim 1, wherein the useable energy form is mechanical or electrical energy.

4. The method as claimed in claim 1, wherein the gaseous working substance flow is partially over heated.

5. The method as claimed in claim 1, wherein the working substance is a multi-substance mixture.

6. The method as claimed in claim 5, wherein the multi-substance mixture comprises ammonia and water.

7. The method as claimed in claim 6, wherein the multi-substance mixture is ammonia and water.

8. The method as claimed in claim 1, wherein the heat source is either geothermal liquid or industrial waste heat.

9. The method as claimed in claim 8, wherein the geothermal liquid is thermal water.

10. The method as claimed in claim 9, wherein the temperature of the thermal water is 100° C. to 200° C.

11. The method as claimed in claim 10, wherein the temperature of the thermal water is preferably 140° C. to 200° C.

12. A thermodynamic cycle system, comprising:
   a pump that pressurizes a liquid working substance flow comprising ammonia and water;
   a separator that separates the pressurized liquid working substance flow into a first partial flow and a second partial flow;
   a first heat exchanger that:
      receives the first partial flow, and
      generates and discharges a partially vaporized first partial flow by transferring heat energy from a geothermal heat source to the first partial flow;
   a second heat exchanger that:
      receives the second partial flow, and
      generates and discharges a partially vaporized second partial flow by transferring heat energy from an expanded working substance flow to the second partial flow;
   a mixer that combines the partially evaporated first partial flow and the partially evaporated second partial flow into a partially evaporated working substance flow;
   a third heat exchanger directly connected to the mixer to receive the partially evaporated working substance flow from the mixer to fully vaporize the working substance by transferring heat energy from a geothermal heat source to the partially evaporated working substance flow;
   a separator circuit arranged after the third heat exchanger for separating residual liquid components from the working substance before the working substance enters a turbine;
   a turbine, that:
      expands the gaseous working substance flow,
      converts energy from the expanded flow into a usable form, and
      discharges the expanded working substance flow; and
   a fourth heat exchanger that receives and completely condenses a partially condensed and expanded working substance flow, the partially condensed and expanded working substance flow being partially condensed in the second heat exchanger, and discharges the liquid working substance flow, wherein a mass flow exiting the second heat exchanger corresponds to a mass flow entering the fourth heat exchanger.

13. The system as claimed in claim 12, wherein the first and second heat exchangers are dimensioned such that the first and the second partially evaporated partial flows have similar temperature and steam content.

14. The system as claimed in claim 12, wherein the useable energy form is mechanical or electrical energy.

15. The method as claimed in claim 12, wherein the gaseous working substance flow is partially over heated.

16. The system as claimed in claim 12, wherein the geothermal heat source is thermal water.

17. The system as claimed in claim 16, wherein the temperature of the thermal water is 100° C. to 200° C.

18. The system as claimed in claim 17, wherein the temperature of the thermal water is preferably 140° C. to 200° C.

* * * * *